US008982267B2

(12) United States Patent
Pavithran et al.

(10) Patent No.: US 8,982,267 B2
(45) Date of Patent: Mar. 17, 2015

(54) CAMERA MODULE WITH PARTICLE TRAP

(75) Inventors: Prebesh Pavithran, Bayan Lepas (MY); Yeow Thiam Ooi, Butterworth (MY); Haw Chyn Cheng, Butterworth (MY); Hung Khin Wong, Sungai Ara (MY); Giap Chye Toh, Butterworth (MY); Shun Kyo Low, Gelugor (MY)

(73) Assignee: Flextronics AP, LLC, Broomfield, CO (US)

( * ) Notice: Subject to any disclaimer, the term of this patent is extended or adjusted under 35 U.S.C. 154(b) by 188 days.

(21) Appl. No.: 13/270,075

(22) Filed: Oct. 10, 2011

(65) Prior Publication Data
US 2013/0027600 A1    Jan. 31, 2013

Related U.S. Application Data

(60) Provisional application No. 61/512,342, filed on Jul. 27, 2011.

(51) Int. Cl.
| | |
|---|---|
| *B60R 1/06* | (2006.01) |
| *H01J 5/02* | (2006.01) |
| *H01L 31/0203* | (2014.01) |
| *H04N 5/225* | (2006.01) |
| *H04N 5/217* | (2011.01) |
| *G03B 3/10* | (2006.01) |

(52) U.S. Cl.
CPC ........... *H04N 5/2171* (2013.01); *H04N 5/2257* (2013.01); *G03B 3/10* (2013.01)
USPC ............ 348/335; 250/239; 257/433; 359/507

(58) Field of Classification Search
USPC ........ 348/335; 250/216, 208.1, 239; 257/432, 257/433; 359/507, 511, 811–830
See application file for complete search history.

(56) References Cited

U.S. PATENT DOCUMENTS

| | | |
|---|---|---|
| 2,279,372 A | 4/1942 | Herzberger |
| 3,087,384 A | 4/1963 | Baur et al. |
| 3,599,377 A | 8/1971 | Dartnell |
| 3,609,270 A | 9/1971 | Jorgensen et al. |
| 4,257,086 A | 3/1981 | Gulliksen |
| 4,290,168 A | 9/1981 | Binge |
| 4,879,592 A | 11/1989 | Ernest |

(Continued)

FOREIGN PATENT DOCUMENTS

| | | |
|---|---|---|
| EP | 1148406 A2 | 10/2001 |
| EP | 1357726 A1 | 10/2003 |

(Continued)

OTHER PUBLICATIONS

"High Precision Optical Assembly Starts Here", 4 pages, Jan. 1996, Opto-Alignment Technology, Inc.

*Primary Examiner* — Sinh Tran
*Assistant Examiner* — Mark Monk
(74) *Attorney, Agent, or Firm* — Haverstock & Owens LLP

(57) ABSTRACT

A camera module including a particle trap. The particle trap may be disposed in the camera module and may be operable to prevent particles from obstructing an optical path defined between a lens assembly and an image sensor. The particle trap may include a particle getter to retain particles in contact with the particle trap. The camera module may be operative to move the lens assembly so as to provide focus on the image sensor for objects at various distances from the camera module. The movement of the lens assembly may be a source of particles retained by the particle trap.

19 Claims, 9 Drawing Sheets

(56) References Cited

U.S. PATENT DOCUMENTS

| | | |
|---|---|---|
| 5,016,993 A | 5/1991 | Akitake |
| 5,034,824 A | 7/1991 | Morisawa et al. |
| 5,095,204 A | 3/1992 | Novini |
| 5,119,121 A | 6/1992 | Kobayashi et al. |
| 5,177,638 A | 1/1993 | Emura et al. |
| 5,196,963 A | 3/1993 | Sato et al. |
| 5,272,567 A | 12/1993 | Inoue |
| 5,510,937 A | 4/1996 | Mogamiya |
| 5,546,147 A | 8/1996 | Baxter et al. |
| 5,689,746 A | 11/1997 | Akada et al. |
| 5,754,210 A | 5/1998 | Haneda et al. |
| 5,805,362 A | 9/1998 | Hayes |
| 5,835,208 A | 11/1998 | Hollmann et al. |
| 5,908,586 A | 6/1999 | Hobbs et al. |
| 5,926,965 A | 7/1999 | Shijo et al. |
| 5,954,192 A | 9/1999 | Iitsuka |
| 5,966,248 A | 10/1999 | Kurokawa et al. |
| 6,091,902 A | 7/2000 | Komatsuzaki et al. |
| 6,282,380 B1 | 8/2001 | Yamamoto |
| 6,292,306 B1 | 9/2001 | Betensky |
| 6,330,400 B1 | 12/2001 | Bittner et al. |
| 6,417,601 B1 | 7/2002 | Kim |
| 6,515,269 B1 | 2/2003 | Webster et al. |
| 6,530,703 B2 | 3/2003 | Nakano et al. |
| 6,597,516 B2 | 7/2003 | Saitoh et al. |
| 6,682,161 B2 | 1/2004 | Yun |
| 6,760,167 B2 | 7/2004 | Meehan et al. |
| 6,762,888 B1 | 7/2004 | Oshima |
| 6,805,499 B2 | 10/2004 | Westerweck et al. |
| 6,869,233 B2 | 3/2005 | Westerweck et al. |
| 6,940,209 B2 | 9/2005 | Henderson |
| 7,010,224 B2 | 3/2006 | Nomura |
| 7,088,525 B2 | 8/2006 | Finizion et al. |
| 7,156,564 B2 | 1/2007 | Watanabe et al. |
| 7,167,376 B2 | 1/2007 | Miyashita et al. |
| 7,193,793 B2 | 3/2007 | Murakami et al. |
| 7,259,497 B2 | 8/2007 | Sakano et al. |
| 7,262,405 B2 | 8/2007 | Farnworth et al. |
| 7,301,712 B2 | 11/2007 | Kamo |
| 7,304,684 B2 | 12/2007 | Segawa et al. |
| 7,330,648 B2 | 2/2008 | Morinaga et al. |
| 7,379,112 B1 | 5/2008 | Raad |
| 7,394,602 B2 | 7/2008 | Chen et al. |
| 7,400,454 B2 | 7/2008 | Kubota et al. |
| 7,420,609 B2 | 9/2008 | Yamaguchi et al. |
| 7,605,991 B2 | 10/2009 | Chiang |
| 7,638,813 B2 | 12/2009 | Kinsman |
| 7,670,067 B2 | 3/2010 | Utz |
| 7,675,565 B2 | 3/2010 | Cheng |
| 7,679,669 B2 | 3/2010 | Kwak |
| 7,682,159 B2 | 3/2010 | Huang et al. |
| 7,806,606 B2 | 10/2010 | Westerweck |
| 8,112,128 B2 | 2/2012 | Lee |
| 2001/0028513 A1 | 10/2001 | Takanashi et al. |
| 2002/0012066 A1 | 1/2002 | Nagai |
| 2002/0018140 A1 | 2/2002 | Suemoto et al. |
| 2002/0102946 A1 | 8/2002 | SanGiovanni |
| 2002/0136556 A1 | 9/2002 | Nomura et al. |
| 2002/0142798 A1 | 10/2002 | Miyake |
| 2002/0144369 A1 | 10/2002 | Biggs et al. |
| 2003/0012573 A1 | 1/2003 | Sekizawa et al. |
| 2003/0043477 A1 | 3/2003 | Saitoh |
| 2003/0174419 A1 | 9/2003 | Kindler et al. |
| 2004/0017501 A1 | 1/2004 | Asaga et al. |
| 2004/0042780 A1 | 3/2004 | Kindaichi et al. |
| 2004/0042785 A1 | 3/2004 | Watanabe et al. |
| 2004/0042786 A1 | 3/2004 | Watanabe et al. |
| 2004/0056970 A1 | 3/2004 | Westerweck et al. |
| 2004/0056974 A1 | 3/2004 | Kitajima et al. |
| 2004/0057720 A1 | 3/2004 | Westerweck et al. |
| 2004/0095657 A1 | 5/2004 | Takanashi et al. |
| 2004/0203532 A1 | 10/2004 | Mizuta |
| 2004/0223068 A1 | 11/2004 | Kamo |
| 2004/0223072 A1 | 11/2004 | Maeda et al. |
| 2004/0258405 A1 | 12/2004 | Shiratori et al. |
| 2005/0014538 A1 | 1/2005 | Hyun et al. |
| 2005/0063698 A1 | 3/2005 | Usuda et al. |
| 2005/0157195 A1 | 7/2005 | Ohashi et al. |
| 2005/0162534 A1 | 7/2005 | Higashiyama et al. |
| 2005/0219399 A1 | 10/2005 | Sato et al. |
| 2005/0248684 A1 | 11/2005 | Machida |
| 2005/0264670 A1 | 12/2005 | Yamaguchi et al. |
| 2006/0016280 A1* | 1/2006 | Hasegawa et al. ............ 74/89.23 |
| 2006/0049720 A1 | 3/2006 | Henderson et al. |
| 2006/0056389 A1 | 3/2006 | Monk et al. |
| 2006/0083503 A1 | 4/2006 | Fukai |
| 2006/0103754 A1 | 5/2006 | Wenstrand et al. |
| 2006/0113867 A1 | 6/2006 | Sakatani et al. |
| 2006/0124746 A1 | 6/2006 | Kim et al. |
| 2006/0209205 A1 | 9/2006 | Tsai |
| 2006/0231750 A1 | 10/2006 | Chao et al. |
| 2006/0243884 A1 | 11/2006 | Onodera et al. |
| 2006/0261257 A1 | 11/2006 | Hwang |
| 2006/0291061 A1 | 12/2006 | Iyama et al. |
| 2007/0053672 A1 | 3/2007 | Westerweck et al. |
| 2007/0074966 A1 | 4/2007 | Yamamoto et al. |
| 2007/0077051 A1 | 4/2007 | Toor et al. |
| 2007/0077052 A1 | 4/2007 | Chang |
| 2007/0086777 A1 | 4/2007 | Fujita |
| 2007/0108847 A1 | 5/2007 | Chang |
| 2007/0122146 A1 | 5/2007 | Ryu |
| 2007/0146489 A1 | 6/2007 | Kosako et al. |
| 2007/0147195 A1 | 6/2007 | Morinaga |
| 2007/0154198 A1 | 7/2007 | Oh et al. |
| 2007/0201866 A1 | 8/2007 | Kihara |
| 2007/0210246 A1 | 9/2007 | Ellenberger et al. |
| 2007/0217786 A1 | 9/2007 | Cho et al. |
| 2007/0228403 A1 | 10/2007 | Choi et al. |
| 2007/0280667 A1 | 12/2007 | Shin |
| 2008/0093721 A1 | 4/2008 | Kang et al. |
| 2008/0297899 A1* | 12/2008 | Osaka et al. .................. 359/507 |
| 2009/0033790 A1 | 2/2009 | Lin |
| 2009/0109554 A1* | 4/2009 | Christison .................... 359/823 |
| 2009/0303591 A1* | 12/2009 | Zhang .......................... 359/507 |
| 2009/0316040 A1* | 12/2009 | Takatsuka et al. ............ 348/376 |
| 2010/0039553 A1 | 2/2010 | Kim et al. |
| 2010/0053412 A1* | 3/2010 | Sekimoto et al. ............. 348/335 |
| 2010/0328525 A1 | 12/2010 | Lee et al. |
| 2011/0052183 A1 | 3/2011 | Westerweck |
| 2011/0286736 A1 | 11/2011 | Aizawa et al. |
| 2011/0292526 A1 | 12/2011 | Westerweck et al. |
| 2012/0018830 A1 | 1/2012 | Lin et al. |
| 2012/0038803 A1 | 2/2012 | Tsai |
| 2012/0068292 A1 | 3/2012 | Ikeda et al. |
| 2012/0104524 A1 | 5/2012 | Takeshita et al. |
| 2012/0141114 A1 | 6/2012 | Gooi et al. |

FOREIGN PATENT DOCUMENTS

| | | |
|---|---|---|
| GB | 1378515 A1 | 12/1974 |
| GB | 2315186 A1 | 1/1998 |
| GB | 2387063 A | 1/2003 |
| JP | 11-72678 | 3/1999 |
| JP | 2002-286987 | 10/2002 |
| WO | 0006973 A1 | 2/2000 |

* cited by examiner

CAMERA MODULE WITH PARTICLE TRAP

RELATED APPLICATIONS

This application claims priority to U.S. Provisional Application Ser. No. 61/512,342, filed Jul. 27, 2011, entitled "THREADLESS LENS BARREL DESIGN", the entirety of which is hereby incorporated by reference.

BACKGROUND

Advances in digital photography have resulted in the incorporation of digital cameras in a variety of devices. For example, many portable electronic devices now include integrated digital cameras. Devices into which digital cameras have been integrated include, for example, cell phones, smart phones, personal digital assistants (PDAs), laptop computers, monitors, and tablet computers, among others. Furthermore, digital cameras are increasingly being incorporated into vehicles and other goods. In this regard, the prevalence of integrated digital cameras in devices continues to increase.

Digital cameras generally operate by exposing an image sensor to light. The image sensor produces electrical signals in response to light striking an active area of the image sensor. The electrical signals are interpretable as digital image files that may, for example, be stored or displayed. Examples of types of image sensors include, for example, CCD sensors, CMOS sensors, and sCMOS sensors.

Regardless of the specific type of image sensor used, "particle drop" is an issue common to all digital camera image sensors. Particle drop refers to when particles (e.g., originating from within the camera module or from an exterior environment) become disposed relative to the image sensor so as to interfere with the operation of the image sensor (e.g., obstructing the path of light to the image sensor causing blemishes, dark spots, or other flaws on images captured by the image sensor). Particularly in the case of integrated camera modules that are sealed or where the image sensor is inaccessible, prevention of particles from entering the optical path of the sensor is important to maintain the quality of images generated by digital camera modules because the image sensor cannot be accessed to be cleaned or cleared of particles. Additionally, as image sensors become smaller, the sensitivity to particle drop increases as even small particles may act to block more pixels of the active area of the image sensor. As such, addressing the particle drop issue continues to be important to maintaining the quality of images captured with digital cameras.

SUMMARY

A first aspect described herein includes a camera module having an image sensor and a lens. An optical path is defined between the lens and the image sensor at least partially along an optical axis of the lens. The camera module also includes at least one particle source. A particle trap is disposed between the at least one particle source and the optical path. The particle trap is adapted to collect particles from the at least one particle source without the particles entering into the optical path. The particle trap includes a particle getter to retain the particles upon contact of the particles with the particle getter.

A second aspect includes a camera module having a frame and one or more guide members positioned relative to the frame. A lens carrier is moveable with respect to the guide members. The guide members are operable to restrict movement of the lens carrier to a direction parallel with an optical axis of a lens supportably engaged by the lens carrier. The camera module also includes an image sensor in disposed relative to the frame, wherein the lens carrier is moveable with respect to the image sensor. The camera module further includes a particle trap extending from the frame. The particle trap terminates adjacent to a lens barrel operatively associated with the lens carrier. The camera module also includes a particle getter disposed on at least a portion of the particle trap. Upon contact of the particles and the particle getter, the particle getter is operable to retain the particles in contact therewith.

A third aspect described herein includes a method for use with a camera module. The method includes moving a first component of the camera module relative to a second component of the camera module. The method further includes generating one or more particles during the moving operation and trapping the one or more particles with a particle trap. The method further includes retaining the one or more particles with a particle getter disposed on the particle trap.

A number of feature refinements and additional features are applicable to the various aspects presented herein. These feature refinements and additional features may be used individually or in any combination. As such, each of the following features that will be discussed may be, but are not required to be, used with any other feature or combination of features of the aspects presented herein.

For example, the lens may be supportably engaged by a lens barrel and the lens barrel may be operatively associable with a lens carrier. The lens carrier may be displaceable with respect to the image sensor along the optical axis of the lens.

In one embodiment, the camera module may include a frame in a fixed relation with respect to the image sensor. The frame may include an inner surface, at least a portion of which defines an inner volume. The optical path may extend through at least a portion of the inner volume.

The camera module may also include a guide member that may be operable to limit movement of the lens carrier to along the optical axis of the lens. The lens carrier may be moveable relative to the guide member. At least a portion of the lens carrier may contact the guide member during movement of the lens carrier with respect to the guide member. In this regard, the at least one particle source may include the contact between the lens carrier and the guide member during the relative movement of the lens carrier and the guide member. The lens barrel may be interconnectable with the lens carrier. In this regard, the at least one particle source may include the interconnection between the lens barrel and the lens carrier.

In one embodiment, the guide member may include one or more shafts engaged with the frame. The one or more shafts extend longitudinally in a direction substantially parallel with the optical axis of the lens.

In another embodiment, the particle trap includes a projection extending from the inner surface of the frame. The projection may include an edge portion adjacent to at least a portion of the lens barrel. For example, the edge portion may extend about substantially all of a perimeter of the lens barrel. In this regard, the edge portion may define an annular opening through which the lens barrel extends. The edge portion may be spaced apart from the lens barrel by a distance less than the average particle size generated by the at least one particle source. In one embodiment, the camera module may also include a groove defined in the particle trap adjacent to at least a portion of the edge portion. The groove may extend adjacent to the entire edge portion. The particle getter may be disposed in at least a portion of the groove.

In another embodiment, the first component may include a lens carrier and the second component may include a guide member. The moving may include moving the lens carrier in an autofocus operation of the camera module. In this regard, the generating operation may include a portion of the first component in contact with the second component during the moving.

DETAILED DESCRIPTION

Figure 1:
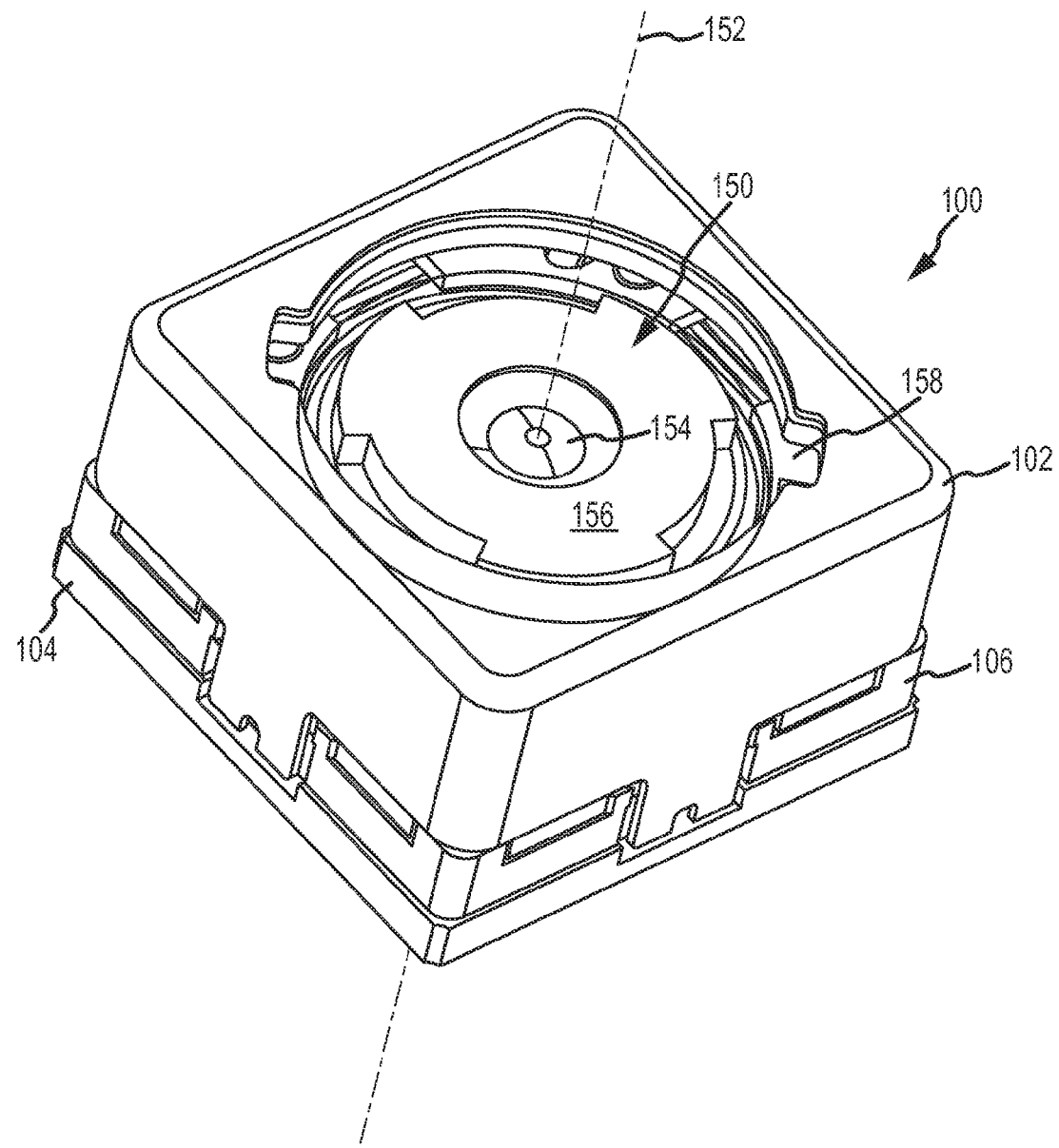
FIG. 1 illustrates a perspective view of an embodiment of a camera module.
Figure 2:
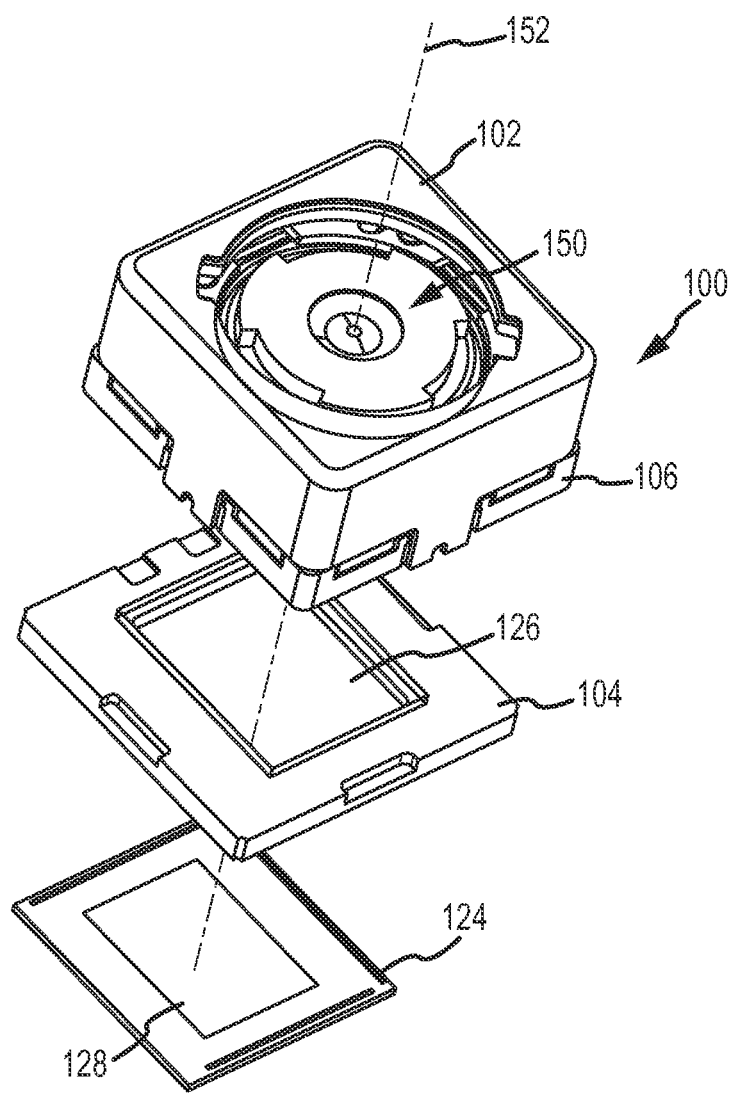
FIG. 2 illustrates an exploded perspective view of the embodiment of FIG. 1.

FIGS. 1 and 2 depict an embodiment of a camera module 100. The camera module 100 may include a substrate 104 to which an image sensor 124 may be operatively engaged. The camera module 100 may include a frame 106 that is operatively engaged with the substrate 104. The image sensor 124 may include an active area 128 that reacts to light to generate electrical signals representative of digital image data. Accordingly, the image sensor 124 may be operable to capture digital images. For example, the image sensor 124 may be a CCD sensor, CMOS sensor, sCMOS sensor, or the like. The camera module 100 may be adapted to be integrated into an electronic device (e.g., a cell phone, smart phone, laptop computer, tablet computer, monitor, personal digital assistant (PDA), etc.) or other good including a digital camera. In turn, the electronic device may include the ability to display and/or store digital images captured by the camera module.

The camera module 100 may include a lens assembly 150. The lens assembly 150 may be positioned with respect to the image sensor 124. In this regard, the lens assembly 150 may be operable to focus light onto the image sensor 124 to produce a digital image. For example, the lens assembly 150 may include a lens comprising one or more lens elements (e.g., lens element 154). The lens assembly 150 may define an optical axis 152. Light entering the lens assembly 150 may travel along an optical path defined between the lens assembly 150 and the image sensor 124. The optical path, for example, may converge or diverge along the optical axis 152 between the lens assembly 152 and the image sensor 124. Light entering the lens assembly 150 may pass through the optical path between the lens assembly 150 and the image sensor 124, along at least a portion of the optical axis 152, and strike the active area 128 of the image sensor 124. The substrate 104 may include an optical filter 126 disposed in the optical path between the lens assembly 150 and the image sensor 124. The camera module 100 may also include an outer cover 102. The outer cover 102 may be operative to help prevent the ingress of particles and/or light into the camera module 100.

In one embodiment, the lens assembly 150 may be movable. For example, the lens assembly 150 may be moveable along the optical axis 152. In this regard, the camera module 100 may be operative to move the lens assembly 150 to bring objects at different distances from the camera module 100 into focus on the image sensor 124. For example, the camera module 100 may be operative to perform an auto-focus process, wherein the lens assembly 150 is moved in order to render an image in focus at the image sensor 124.

Figure 3:
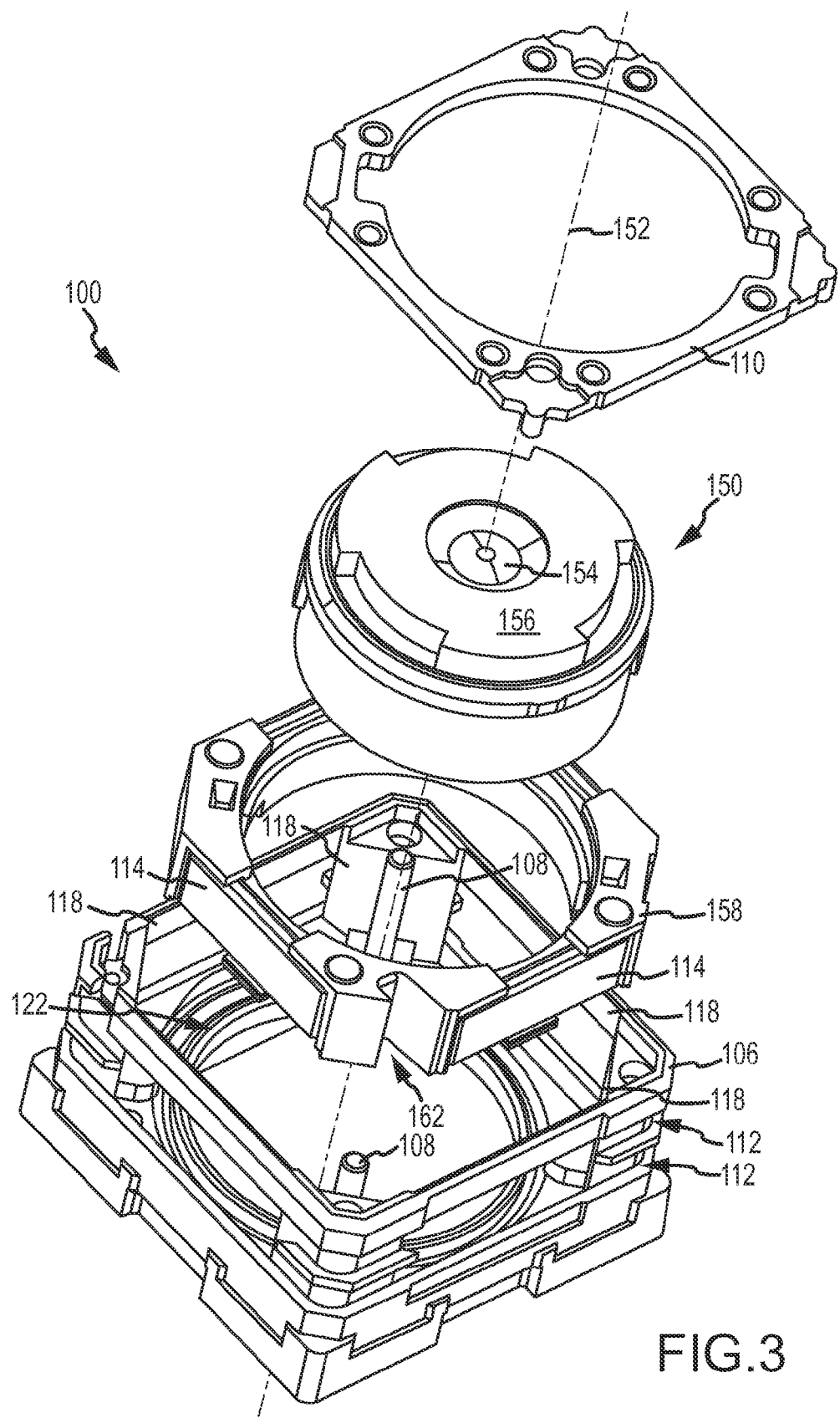
FIG. 3 illustrates another exploded perspective view of an embodiment of a shaft holder, a lens assembly, a lens carrier, and camera module frame.

With additional reference to FIG. 3, the lens assembly 150 may include lens elements (e.g., lens element 154) that are supportably engaged by a lens barrel 156. The lens barrel 156 may be engaged with a lens carrier 158. As will be discussed in greater detail below, the lens carrier 158 may be operatively associated with an actuator to move the lens carrier 158 along the optical axis 152 in order bring on objects at different distances from the camera module 100 into focus on the image sensor 124. While the lens assembly 150 is shown in a disconnected state from the lens carrier 158 in FIG. 3, the lens assembly 150 may be selectively interconnected with the lens carrier 158. The interconnection of the lens assembly 150 with the lens carrier 158 may be by way of, for example, corresponding interlocking portions, a threaded engagement, or other techniques known in the art.

In this regard, as the lens carrier 158 is moved, the lens assembly 150 undergoes corresponding movement. The lens carrier 158 may be moved in a direction generally parallel with the optical axis 152 (i.e., further from or nearer to the image sensor 124 along the optical axis 152). The movement of the lens carrier 158 may be guided by one or more guide members. The guide members (e.g. shafts 108) may help to constrain movement of the lens carrier 158 to a direction along the optical axis 152. For example, one or more shafts 108 may be provided to guide the movement of the lens carrier 158 along the optical axis 152. A shaft holder 110 may be engaged with the frame 106 in order to assist in maintaining the one or more shafts 108 in an orientation so as to guide the movement of the lens carrier 158 in a direction parallel with the optical axis 152. It will be appreciated that more than one shaft 108 (e.g., two or more shafts 108) may be provided such that the longitudinal axes of the shafts 108 are generally parallel with the optical axis 152 of the lens assembly 150. The lens carrier 158 may include corresponding apertures or recesses 162 that are contoured to accommodate the shafts 108. Additionally, the lens carrier 158 may be shaped to fit within an interior volume 122 of the frame 106 defined by one or more inner surfaces 118 of the frame 106. That is, the lens carrier 158 may have a shape corresponding to the inner surfaces 118 of the frame 106. In this regard, it will be appreciated that the lens carrier 158 may be able to move along the optical axis 152 as guided by the shafts 108 and/or inner surfaces 118 of the frame 106.

Figure 4:
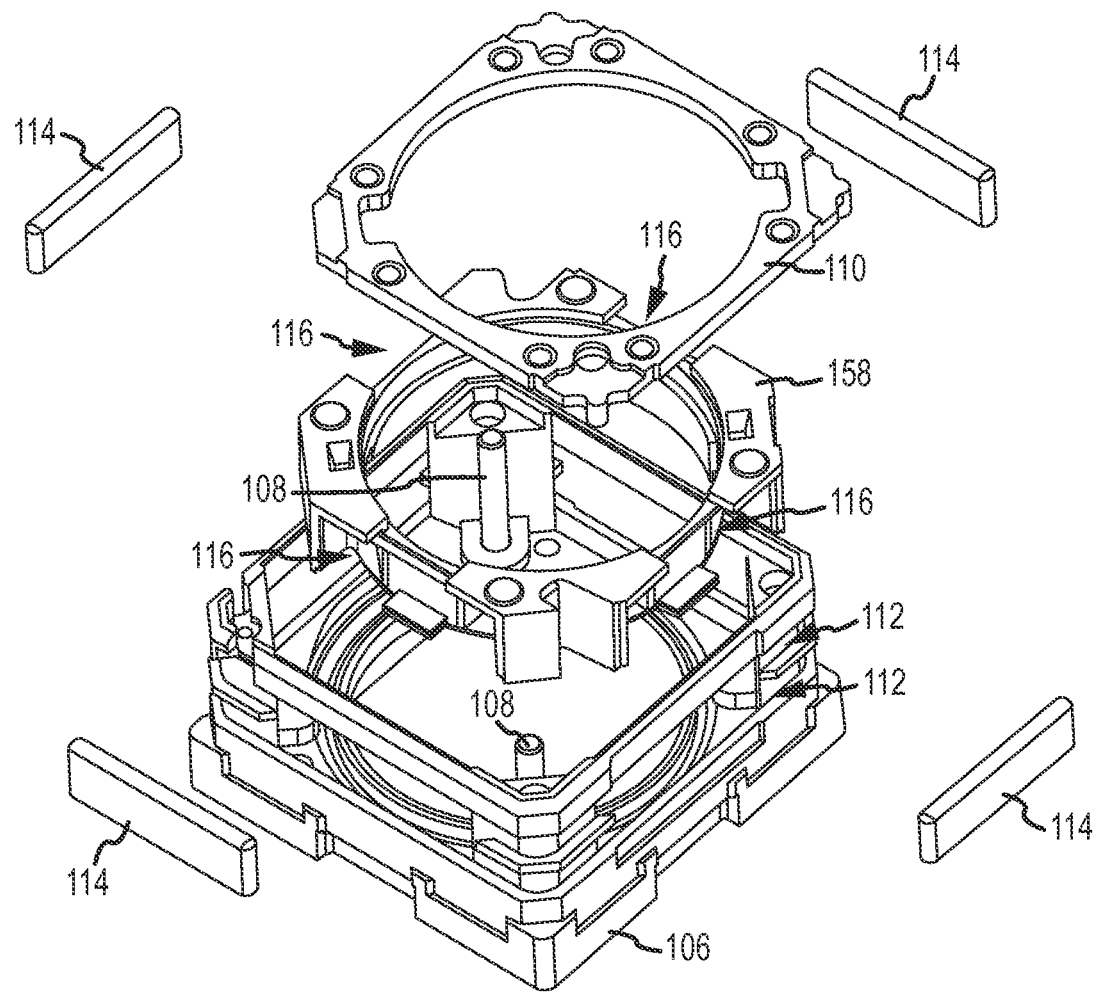
FIG. 4 illustrates an exploded perspective view of the embodiment of FIG. 1, including an embodiment of an actuator for movement of a lens carrier.
Figure 5:
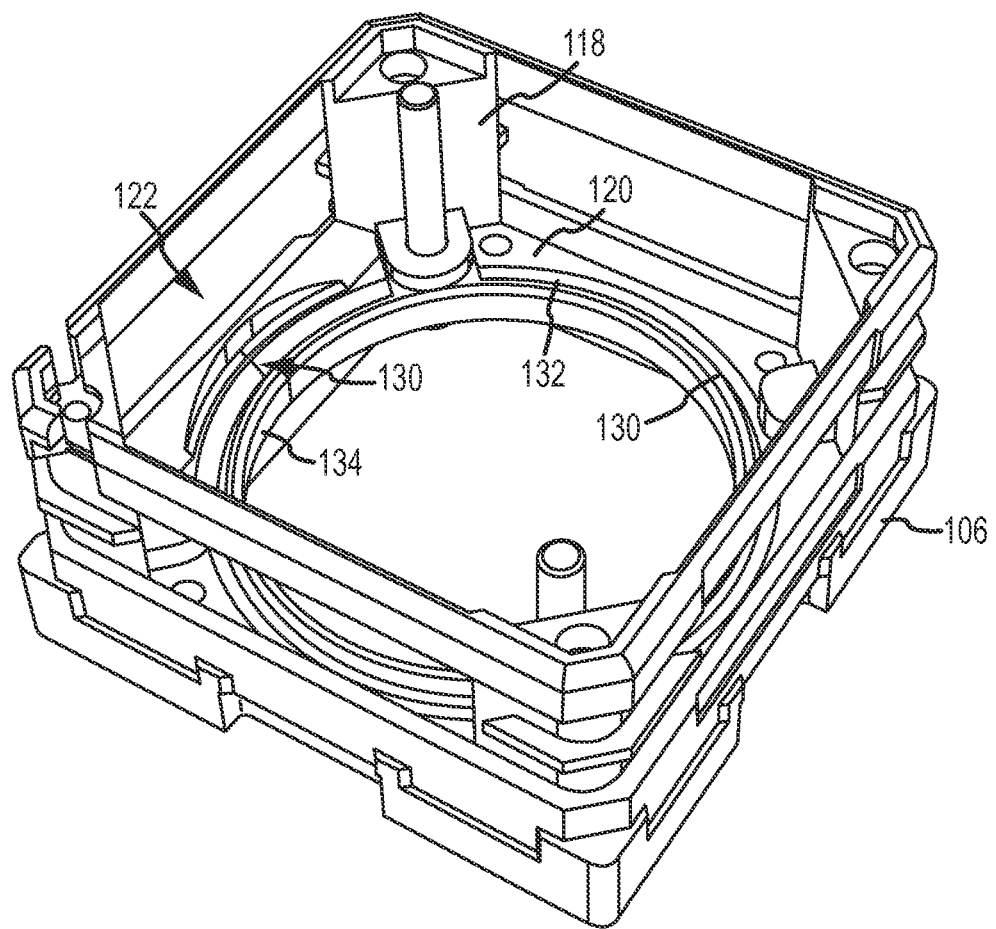
FIG. 5 illustrates a perspective view of an embodiment of a frame of a camera module including a particle trap.

In one embodiment, the lens carrier 158 may be moved along the optical axis 152 by way of a voice coil actuator. With additional reference to FIG. 4, the lens carrier 158 may include magnet recesses 116 adapted to accommodate corresponding magnets 114 (shown in an exploded state in FIG. 4). For example, a magnet recess 116 and corresponding magnet 114 may be provided on each side of the lens carrier 158, as is shown in FIG. 4. The frame 106 may also include coil recesses 112 extending about an exterior surface of the frame 106. The coil recesses 112 may be adapted to receive corresponding electrical coils 138 (not shown in FIG. 4 for clarity). The coils 138 disposed in the coil recesses 112 are depicted in the cross sectional view of the camera module 100 shown in FIG. 9. There may be provided a pair of coil recesses 112 to accommodate an upper and lower coil 138. In this regard, either one or both of the coils 138 may be energized in order to induce a magnetic field. The induced magnetic field may interact with the magnets 114 disposed in the magnet recesses 116 of the lens carrier 158. In this regard, the magnets 114 may be moved by way of the interaction between the magnets 114 and the magnetic field induced by controlling the energizing of the coils 138 disposed in the coil recesses 112. Because the magnets 114 are disposed in the magnet recesses 116 of the lens carrier 158, the lens carrier 158 may be correspondingly moved along with the magnets 114. As a result, controlling the energizing of the coils may control the position of the lens carrier 158 along the optical axis 152.

As can be appreciated, there may be one or more particle sources that produce particles capable of entering the optical path and obstructing the image sensor 124. A particle source may be located within the camera module 100 or may be exterior to the camera module 100. For example, during the manufacturing process, particles may enter the camera module 100 from an exterior environment, especially in the case where the device into which the camera is incorporated is not assembled in a clean-room. Moreover, a particle source may be within the camera module 100. It will be appreciated that, especially in the case where components within the camera module 100 undergo relative movement, particles may be generated from components within the camera module 100. The relative movement of components in the camera module may be experienced during the assembly processes (e.g., engagement of the lens assembly 150 with the lens carrier 158), during operation of the camera module (e.g., during a focusing operation), or other operations during which components undergo relative movement.

For example, in one embodiment, the camera module 100 may be operable to perform a focusing operation wherein the lens assembly 150 is moved relative to the image sensor 124 in order to focus an image on the sensor portion 128 of the image sensor 124. As such, the lens carrier 158 may come into contact with the shafts 108 or other guide members provided in the camera module (e.g., an inner surface 118 of the frame 106) as the lens carrier 158 moves along the optical axis 152. In this regard, the contact of and relative movement between the shaft 108 and the lens carrier 158, and/or the contact of and relative movement between the inner surface 118 of the frame 106 and the lens carrier 158, may result in the production of particles. For example, particles may be sheared or otherwise separated from the lens carrier 158 and/or the shafts 108 when the lens carrier 158 contacts the shafts 108 as the lens carrier 158 is moved relative to the shafts 108. It will be further appreciated that additional particle sources may be present within the camera module 100. For example, the engagement of the lens assembly 150 with the lens carrier 158 may also result in the production of particles as the lens assembly 150 contacts the lens carrier 158 and moves relative thereto. Furthermore, other particle sources may be present, either within the cover 102 of the camera module 100 or from an external source.

Accordingly, with additional reference to FIGS. 5-8, a particle trap 130 may be provided. The particle trap 130 may be operative to help prevent particles generated within the camera module, or particles entering the camera module 100 from an exterior environment, from entering the optical path and obscuring the image sensor 124. For example, the particle trap 130 may include a shelf 120 extending from the inner surface 118 of the frame 106. The shelf 120 may extend into the inner volume 122. The shelf 120 may define an edge portion 134. In the depicted embodiment, the edge portion 134 may be generally annular. In one embodiment, the edge portion 134 may generally correspond to the perimeter of the lens barrel 156 as will be described further below. The shelf 120 may include a groove 132. For example, the groove 132 may extend along at least part of the edge portion 134.

Figure 6:
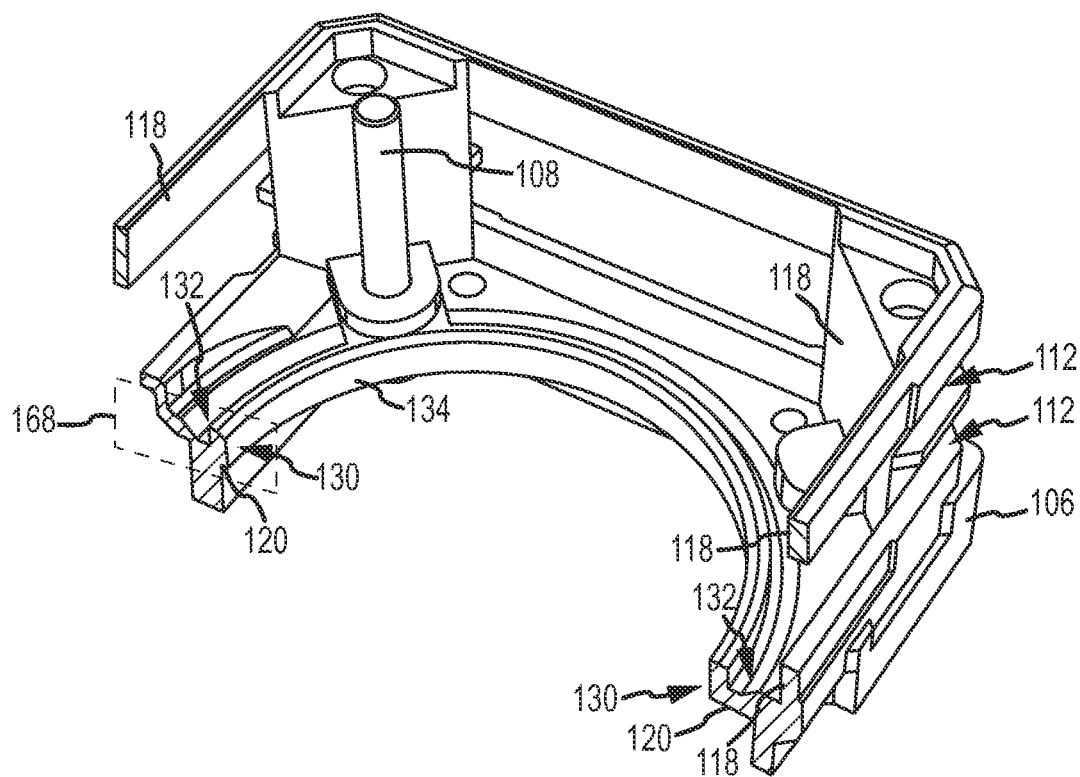
FIG. 6 illustrates a cut-away perspective view of the embodiment of the frame shown in FIG. 5.
Figure 7:
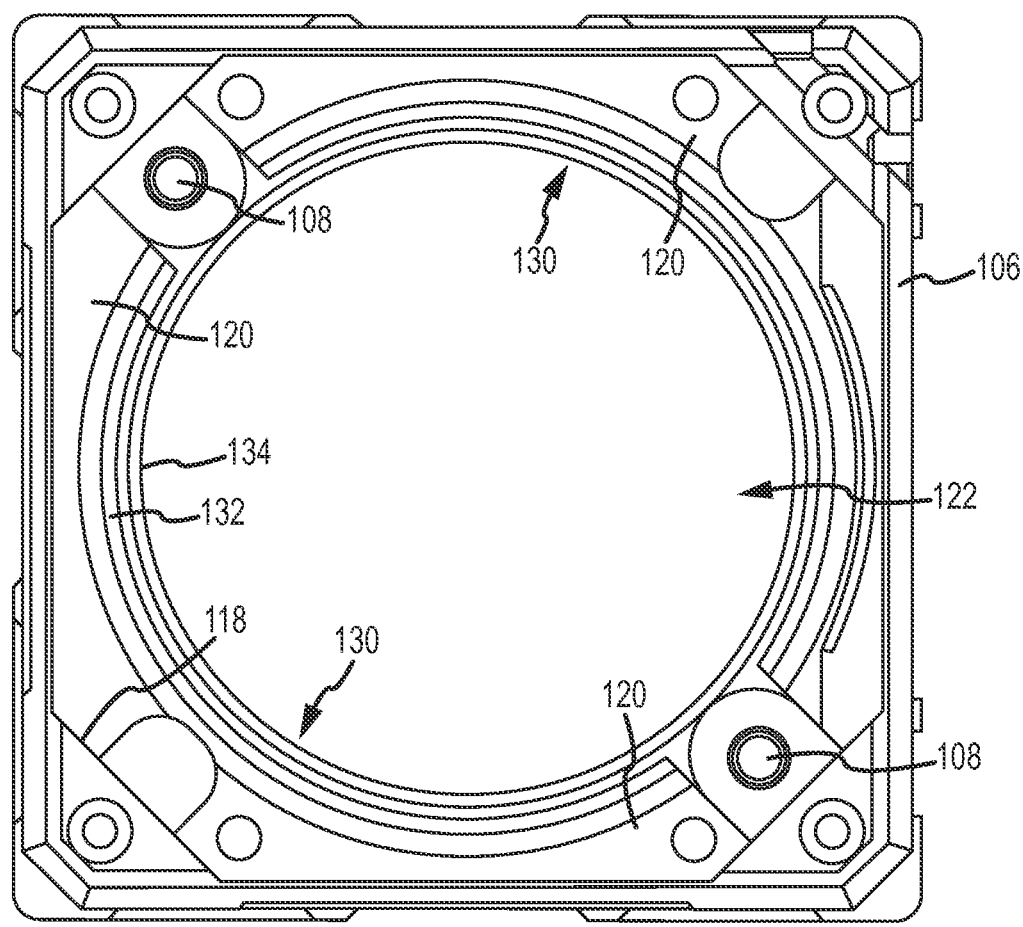
FIG. 7 illustrates a front view of the embodiment of the frame shown in FIG. 5.
Figure 8:
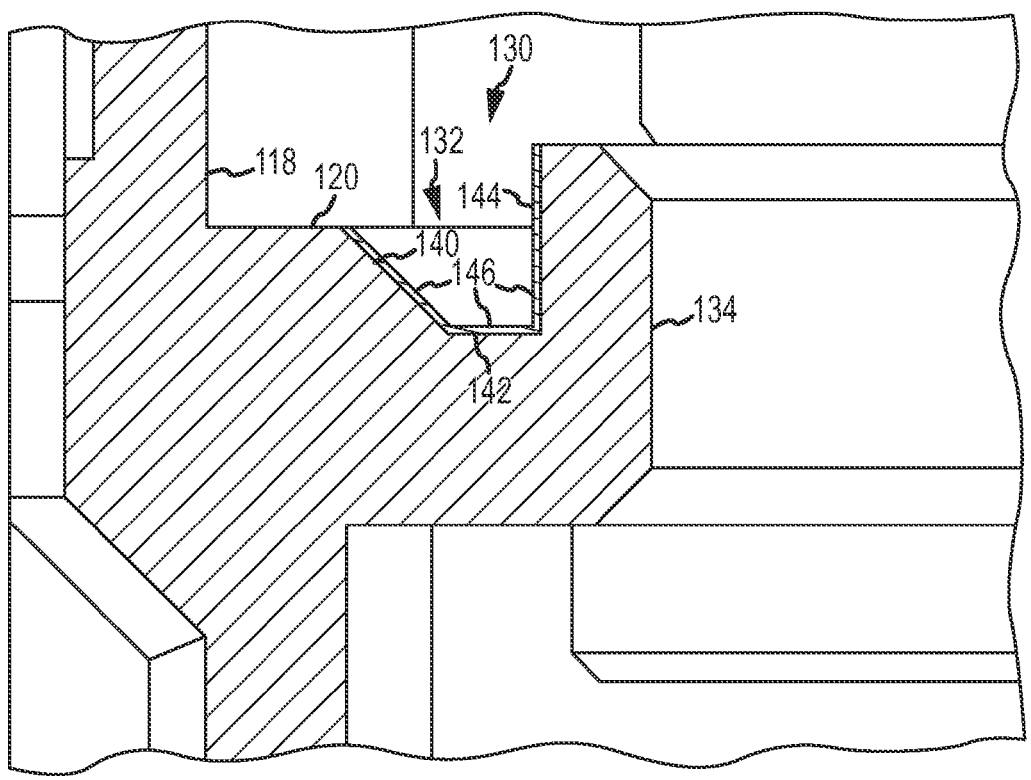
FIG. 8 illustrates a detailed cross-sectional view of the embodiment of the frame of FIG. 5.

FIG. 8 shows a detailed cross-sectional view of the particle trap 130 taken at plane 168 in FIG. 6. In FIG. 8 it can be appreciated that the groove 132 includes a sloped side 140 that is inclined with respect to a bottom surface 142. The groove 132 may include a sidewall 144 opposite the sloped side 140. The sidewall 144 may extend from the bottom surface 142 a greater distance than the sloped side 140.

Figure 9:
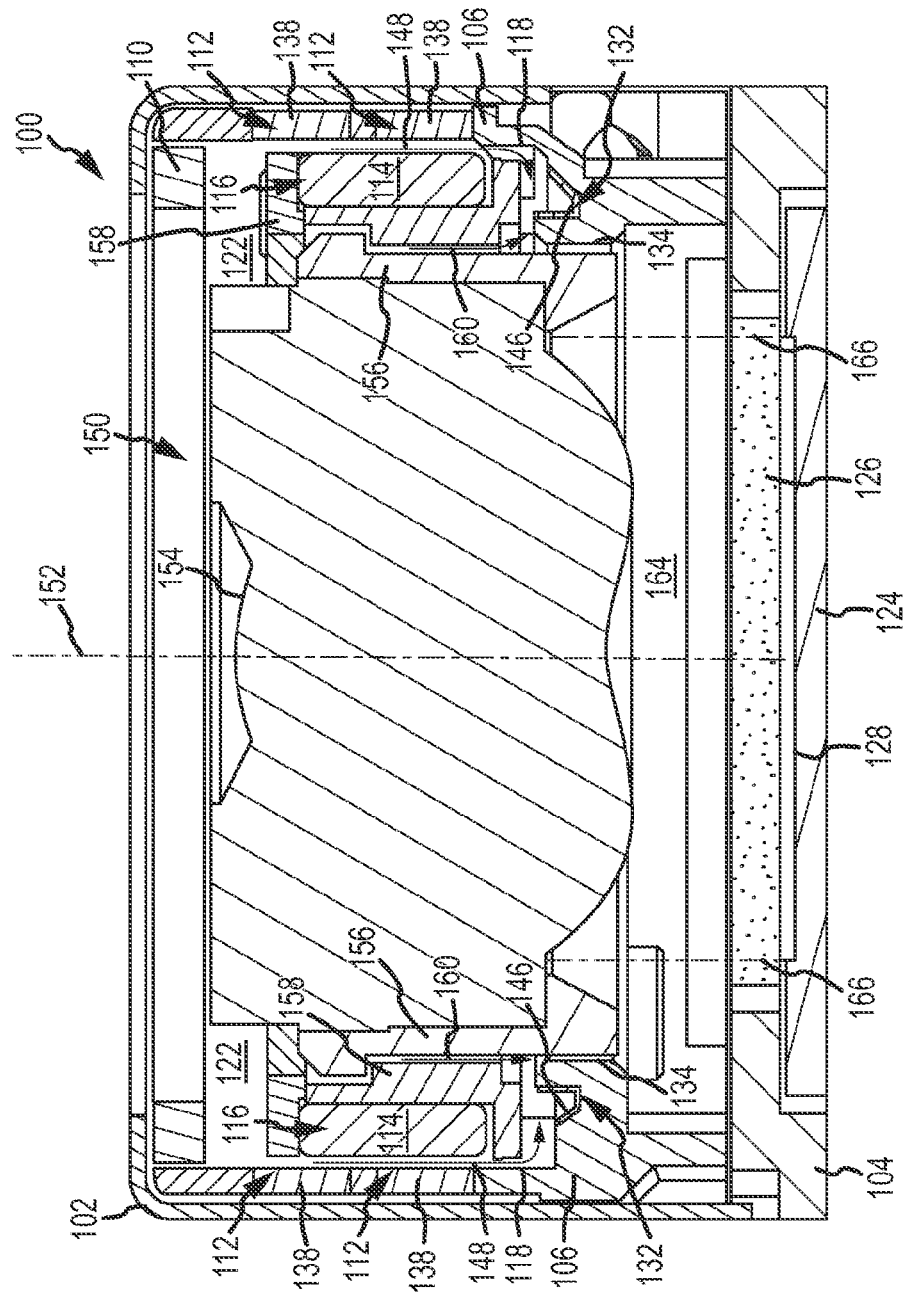
FIG. 9 illustrates a cross-sectional view of an embodiment of a camera module.

Additionally, the particle trap 130 may include a particle getter 146. For example, the particle getter 146 may be disposed in the groove 132 as shown in FIG. 9. The particle getter 146 may comprise a sticky or tacky substance. In this regard, a particle that comes into contact with the particle getter 146 may be retained in contact with the particle getter 146 as a result of the particle adhering to the sticky or tacky surface. For example, the particle getter 146 may comprise an epoxy resin or the like. In an embodiment, the particle getter 146 may substantially fill the groove 132. Alternatively, as shown in FIG. 9, the particle getter 146 may line the sloped side 140, bottom surface 142, and sidewall 144 of the groove 132. The particle getter 146 may also be disposed on the shelf 120, edge portion 134, inner surface 118, or other portions of the camera module 100.

FIG. 9 depicts a cross section of the camera module 100. Accordingly, the relative position of the lens assembly 150 with respect to the image sensor 124 and the optical path 164 extending therebetween may be appreciated. It may further be appreciated that while the optical path 164 may not actually occupy the entire space between the lens assembly 150 and image sensor 124, the theoretical boundaries of a potential optical path 164 extending between the lens assembly 150 and the image sensor 124 is represented in FIG. 9 by dashed lines 166. As such, the optical path 164 shown in FIG. 9 is illustrative and not intended to be limiting but is intended to represent the space through which any possible optical path 164 may exist. For example, optical paths may exist that converge or diverge between the lens assembly 150 and the image sensor 124 as described above. In any regard, the particle trap 130 described herein may limit the number of particles entering any optical path 164 provided between the lens assembly 158 and image sensor 124.

In one embodiment, the shelf 120 may coordinate with the lens barrel 156 to limit the ingress of particles into the optical path 164. The lens assembly 150 (e.g., specifically the lens barrel 156) may extend nearer to the image sensor 124 than the lens carrier 158. As such, the edge portion 134 of the shelf 120 may extend adjacent to the lens barrel 156. Thus, at least a portion of the lens barrel 156 may extend through the annular opening defined by the edge portion 134 of the particle trap 130. Accordingly, the groove 132 defined adjacent to the edge portion 134 of the shelf 120 may extend about at least a portion of lens barrel 156. In one embodiment, the edge portion 134 extends about substantially all of the lens barrel 156. In this regard, the groove 132 may also extend about substantially all of the lens barrel 156.

Particles generated by the movement of the lens carrier 158 or particles entering the camera module 100 may generally travel along a path shown by the arrows 148 in FIG. 9. As can be appreciated, as particles travel along the path defined by the arrows 148, particles may become disposed in the groove 132 without passing between the lens barrel 156 and the edge portion 134. In this regard, the particle getter 146 may retain the particles in the groove 132 once disposed therein to help prevent particles from entering the optical path 164. Accordingly, particles generated by the lens carrier 158 moving relative to a guide member (e.g., the shafts 108) may travel into the groove 132 at least partially based on the positioning of the groove 132 with respect to the lens barrel 156. Furthermore, the geometry of the sloped side 140, bottom surface 142, and sidewall 144 may assist in trapping particles in the groove 132. Because the sloped side 140 is inclined toward the bottom surface 142, particles may travel down the sloped side 140 toward the bottom surface 144. Furthermore, because the sidewall 144 extends above the bottom surface 142 a greater distance than the sloped side 140, the sidewall 144 may act to help retain particles in the groove 132.

Because the lens barrel 156 may move with respect to the edge portion 134 (e.g., in order for the lens assembly 150 to be moved along the optical axis 152), there may be gap provided between the edge portion 134 and the lens barrel 156. However, the edge portion 134 and lens barrel 156 may be sized such that the gap between the edge portion 134 and the lens barrel 156 is less than the average particle size generated within the module 100. In this regard, particles generated by way of the relative movement of the lens barrel 156 with respect to the lens carrier 158 (e.g., during the engagement thereof) may travel along a path defined by arrows 160. As such, the particles may not pass between the lens barrel 156 and the edge portion 134. Accordingly, even if a particle was to travel along the path shown by arrows 160 such that the particle did not become disposed in the groove 132, a particle may not be able to pass between the edge portion 134 and the lens barrel 156 due to the controlled gap size existing between the elements. Furthermore, the particles traveling along the path defined by arrows 160 may become disposed in the groove 132. In this regard, the particle trap 130 may be operative to prevent particles from entering the optical path such that the active area 128 of the image sensor 124 is not obscured.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A camera module, comprising:
   an image sensor;
   a lens, wherein an optical path is defined between the lens and the image sensor at least partially along an optical axis of the lens;
   at least one particle source having at least one particle aperture where particles are able to exit the at least one particle source;
   and a particle trap having a groove and disposed between the at least one particle source and the optical path, the groove being laterally offset from the particle aperture such that the groove and the particle aperture do not overlap parallel to the optical axis and the groove being adapted to collect particles from the at least one particle source without the particles entering into the optical path, wherein the particle trap includes a particle getter within the groove to retain the particles upon contact of the particles with the particle getter, wherein the at least one particle source includes the contact between a lens carrier and a guide member during the relative movement of the lens carrier and the guide member, and further wherein the guide member is operable to limit movement of the lens carrier to along the optical axis of the lens.

2. A camera module according to claim 1, wherein the lens is supportably engaged by a lens barrel and the lens barrel is operatively associable with the lens carrier, and wherein the lens carrier is displaceable with respect to the image sensor along the optical axis of the lens.

3. A camera module according to claim 2, further comprising:
   a frame in a fixed relation with respect to the image sensor, the frame including an inner surface at least a portion of which defines an inner volume, wherein the optical path extends through at least a portion of the inner volume.

4. A camera module according to claim 3, wherein the lens carrier is moveable relative to the guide member, and wherein at least a portion of the lens carrier contacts the guide member during movement of the lens carrier with respect to the guide member.

5. A camera module according to claim 4, wherein the lens barrel is interconnectable with the lens carrier, wherein the at least one particle source includes the interconnection between the lens barrel and the lens carrier.

6. A camera module according to claim 3, wherein the guide member includes one or more shafts engaged with the frame, wherein said one or more shafts extend longitudinally in a direction substantially parallel with the optical axis of the lens.

7. A camera module according to claim 3, wherein the particle trap includes a projection extending from the inner surface of the frame, wherein the projection includes an edge portion adjacent to at least a portion of the lens barrel.

8. A camera module according to claim 7, wherein the edge portion extends along all of a perimeter of the lens barrel.

9. A camera module according to claim 8, wherein the edge portion defines an annular opening through which the lens barrel extends.

10. A camera module according to claim 9, wherein the edge portion contacts the lens barrel such that the edge portion is slidably engaged with the lens barrel.

11. A camera module according to claim 10, wherein the groove is adjacent to at least a portion of the edge portion.

12. A camera module according to claim 11, wherein the groove extends adjacent to the entire edge portion.

13. A camera module according to claim 12, wherein the particle getter is disposed in at least a portion of the groove.

14. A camera module, comprising
   a frame;
   one or more guide members positioned relative to the frame;
   a lens,
   a lens carrier moveable with respect to the guide members, wherein the guide members are operable to restrict movement of the lens carrier to a direction parallel with an optical axis of a lens supportably engaged by the lens carrier;
   an image sensor in disposed relative to the frame, wherein the lens carrier is moveable with respect to the image sensor, wherein an optical path is defined between the lens and the image sensor at least partially along the optical axis of the lens, and further wherein a particle source cavity is formed laterally between the frame and the lens carrier, the particle source cavity having a lower opening where particles are able to exit the cavity toward the optical path;

a particle trap extending from the frame, wherein the particle trap terminates adjacent to a lens barrel operatively associated with the lens carrier, and further wherein the particle trap comprises an annular groove defined by a floor, an inner wall and an outer wall, wherein the outer wall is angled with respect to the optical axis such that the top of the outer wall is farther away from the inner wall than the bottom of the outer wall, the inner wall is substantially parallel with the optical axis and the inner wall is taller than the outer wall, wherein the groove is laterally offset from the lower opening such that the groove and the lower opening do not overlap parallel to the optical axis; and a particle getter disposed on at least a portion of the particle trap, wherein upon contact of the particles and the particle getter, the particle getter is operable to retain the particles in contact therewith.

15. A camera module according to claim 14, wherein the annular groove is adjacent to an edge portion of the particle trap, wherein the edge portion extends about a perimeter of the lens barrel.

16. A camera module according to claim 15, wherein the particle getter is disposed in the annular groove.

17. A method for use with a camera module, the method comprising:

moving a first component of the camera module relative to a second component of the camera module;

generating one or more particles during the moving operation;

trapping the one or more particles after the particles exit a particle aperture between the first component and the second component with a groove of a particle trap, wherein the groove is laterally offset from the particle aperture such that the groove and the particle aperture do not overlap parallel to an optical axis of the first component, and further wherein the particle trap comprises an annular groove defined by a floor, an inner wall and an outer wall, wherein the outer wall is angled with respect to the optical axis such that the top of the outer wall is farther away from the inner wall than the bottom of the outer wall; and retaining the one or more particles with a particle getter disposed on the particle trap.

18. A method according to claim 17, wherein the first component includes a lens carrier and the second component includes a guide member, and wherein the moving includes moving the lens carrier in an autofocus operation of the camera module.

19. A method according to claim 17, wherein the generating operation includes a portion of the first component in contact with the second component during the moving operation, wherein a particle produced during the generating operation includes a portion of one of the first component and second component sheared during the moving.

* * * * *